United States Patent [19]

Steffen

[11] 4,419,783

[45] Dec. 13, 1983

[54] REMOTE CONTROL FOR A VACUUM CLEANER MOTOR

[75] Inventor: Cennert O. Steffen, Taby, Sweden

[73] Assignee: Aktiebolaget Electrolux, Stockholm, Sweden

[21] Appl. No.: 377,691

[22] Filed: May 13, 1982

[30] Foreign Application Priority Data

Jun. 18, 1981 [SE] Sweden ............................... 8103840

[51] Int. Cl.³ ............................................. A47L 9/00
[52] U.S. Cl. ..................................... 15/339; 15/412; 336/DIG. 2
[58] Field of Search ........................ 15/339, 377, 412; 336/DIG. 2

[56] References Cited

U.S. PATENT DOCUMENTS

| | | | |
|---|---|---|---|
| 3,387,319 | 6/1968 | Ferraris et al. ................... | 15/377 X |
| 3,855,665 | 12/1974 | Schwartz .............................. | 15/339 |
| 3,958,297 | 5/1976 | Hukuba et al. ..................... | 15/377 X |
| 4,303,902 | 12/1981 | Lesster et al. ................. | 336/DIG. 2 |

FOREIGN PATENT DOCUMENTS 1366134   9/1974   United Kingdom ......... 336/DIG. 2

*Primary Examiner*—Chris K. Moore
*Attorney, Agent, or Firm*—Alfred E. Miller

[57] ABSTRACT

A vacuum cleaner having a suction nozzle which is connected to the cleaner by means of a suction hose and an operating handle and a tubular shaft. An adjustment knob is mounted on the operating handle for varying the speed of the electric motor. The speed is controlled by a variable resistor which has electrical conductors arranged in the vacuum cleaner hose. The conductors are connected to a first coil which surrounds the end of the hose. A second coil in the vacuum cleaner surrounds the first coil concentrically and is connected to the electric control device for the vacuum cleaner.

6 Claims, 2 Drawing Figures

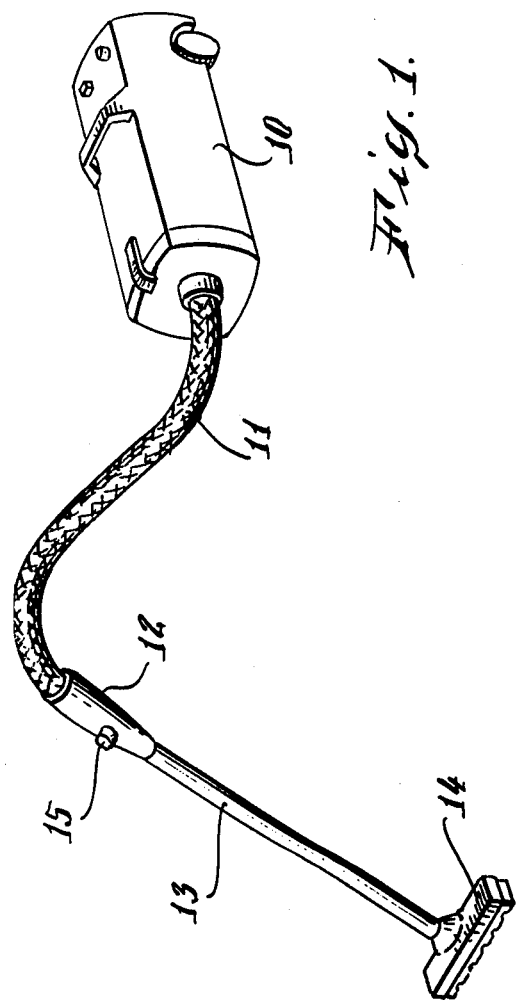

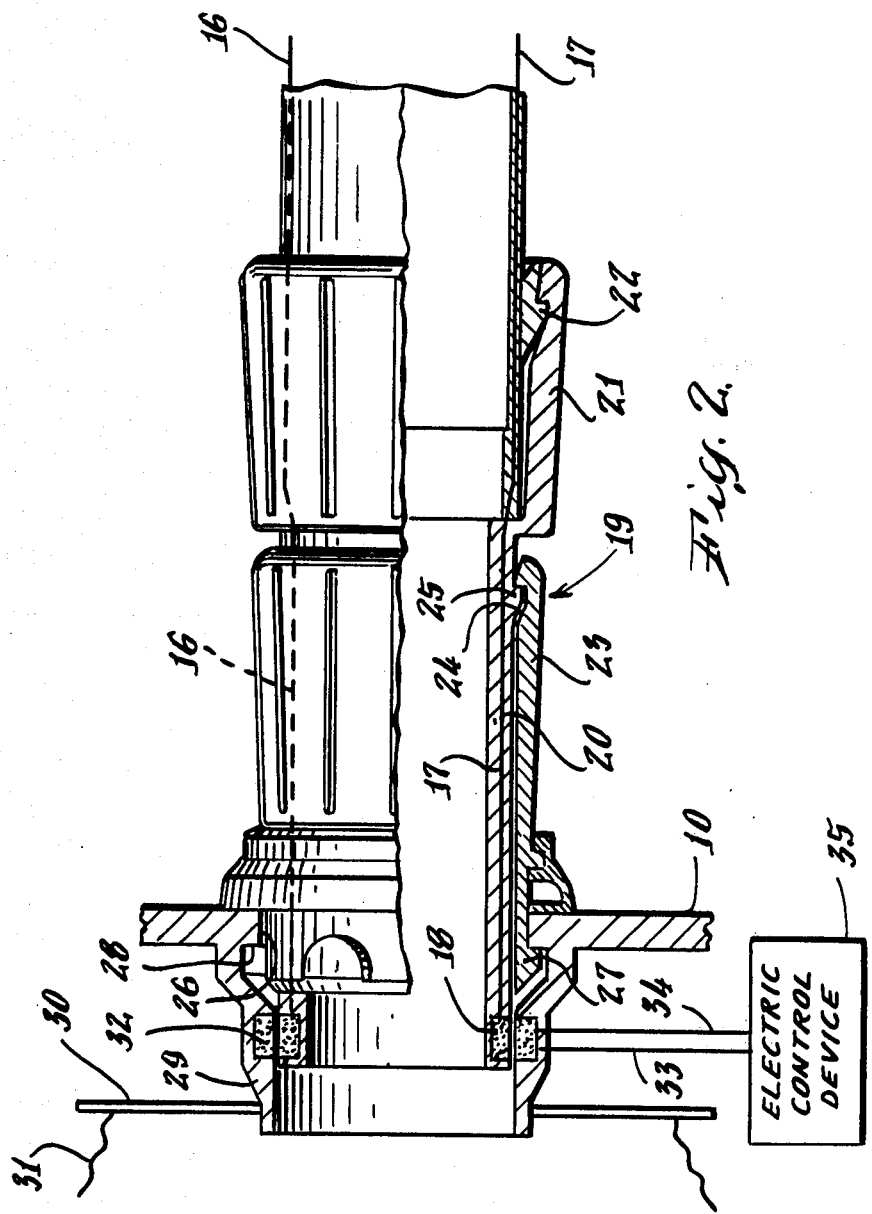

REMOTE CONTROL FOR A VACUUM CLEANER MOTOR

The invention relates to a remote control device for varying the speed of an electric motor of a vacuum cleaner.

Control devices for varying the speed of vacuum cleaner motors are known, and in one such device an electronic circuit is carried by the vacuum cleaner. A potentiometer for operating the electronic circuit is arranged on the operating handle included in a hose connection between the vacuum cleaner and a suction nozzle. In addition, electric conductors in the hose connect the potentiometer to the electronic circuit by means of a transformer which insures that the electrical conductors are, at all times, under low voltage only, and are galvanically separated from the mains voltage to which the vacuum cleaner can be connected.

In the above-described known arrangement, the electrical conductors in the hose are connected to terminals arranged in a vacuum cleaner and connected to the electronic control circuit. This connection is established by means of contacts arranged in that end of the hose which is connected to the vacuum cleaner. Furthermore, if the hose is pivotally attached to the vacuum cleaner, the contacts have to be trailing contacts coacting with slip rings.

The contacts required for the above-described known arrangements, often involve problems since oxide is easily formed on these contacts, and in particular, if the current is of low intensity. Thus, often the contact function is impaired in the known constructions, and in some cases may cease completely, which results in breaks or termination of operation. Furthermore, the use of trailing contacts involves an increase wear of contacts and slip rings. To avoid these problems, the contacts have to be made of high quality material, thus resulting in additional costs in connection with the fabrication of electric control devices for vacuum cleaner motors.

It is an object of the present invention to eliminate the use of contacts in connection with the use of a potentiometer, and electronic control circuits. It is also an object of the present invention, at the same time, to eliminate an iron-fitted transformer, which is necessary for isolating the electrical conductors of the hose.

In order that the invention will be more clearly understood, it will now be disclosed in greater detail with reference to the accompanying drawings, in which:

FIG. 1 is a perspective view of the vacuum cleaner with suction hose and suction nozzle, as well as the control knob for adjusting speed of the electric motor, in accordance with the teachings of the present invention.

FIG. 2 is a part sectional and part elevational view of the vacuum cleaner housing and suction hose.

As seen in FIG. 1, a vacuum cleaner 10 is illustrated having a hose 11, and operating handle 12 and a tubular wand 13. The hose 11, handle 12 and wand 13 are all joined in series so that the vacuum cleaner 10 is connected to a suction nozzle 14. A knob 15 is mounted in the operating handle for controlling a variable resistor (not shown) located in the operating handle. The resistor is connected to a coil 18, as seen in FIG. 2, by means of electric conductors or conduits 16 and 17. It will be evident that the conductors 16 and 17 are embedded in the hose envelope, or arranged in the hose in some other fashion.

The hose 10 is provided with a coupling part which is designated generally by the reference numeral 19. The coupling comprises an elongated sleeve 20, one end of which supports the coil 18, while the other end of which has a socket 21 enclosing the hose 11, and being attached in a fixed manner to the hose by a wedge-shaped locking sleeve 22. The hose is surrounded by a sleeve 23 having an annular recess 24 into which an annular bead 25 engages. The sleeve 20 has grooves (not shown) which guide the electric conductors 16 and 17 from the hose 11 to the coil 18.

The coupling part 19, as seen in FIG. 2, is inserted into an opening 26 in the housing of the vacuum cleaner 10. The coupling part is fixed in the opening by locking projections 27 of a bayonet type which are arranged on the periphery of the mouth of sleeve 23 and coact with an annular edge portion 28 in opening 26. The foregoing is accomplished after having inserted coupling part 19 into axial grooves (not shown) which are located along the periphery of the opening 26. A tubular-shaped flange 29 extends inwardly from the opening 26, and at its free end enters into an aperture of the cardboard disc 30 forming the cover of a dust container 31. In addition, the tubular flange 29 supports a coil 32 which concentrically surrounds the coil 18 and is located radially opposite the coil 18. Thus, the variable resistor is magnetically connected to the control device 35 by means of the concentric coils 18 and 32, and all contacts, such as trailing contacts coacting with slip rings, are avoided and eliminated. Another advantage of the present construction over known arrangements is that the magnetic coils 18 and 32 can be turned freely relative to one another without affecting the function thereof. Moreover, the coils are made as ironless coils which necessitates in operation a frequency considerably higher than that of the mains. Therefore, the electric control device 35 must be equipped with the necessary means to increase the operational frequency, however this means does not form part of the present invention, and consequently there is no need to illustrate and describe the same.

While the present Invention has been disclosed and described with reference to a single embodiment, it will be apparent that variations and modifications may be made therein which fall within the true spirit and scope of the invention as defined in the following claims.

I claim:

1. A remote control device for an electric motor of a vacuum cleaner having a hose including an operating handle connected to a suction nozzle, comprising: an electric control device for said motor mounted on said operating handle and being manually operable, electric conduits extending along said hose and being connected to said electric control device, a first coil connected to one of said conduits, said coil being arranged to surround the end of the hose which is connected to said vacuum cleaner, and a second coil magnetically coupled to said first coil and connected to said electric control device.

2. A device as claimed in claim 1 wherein said second coil concentrically surrounds said first coil.

3. A remote control device for an electric motor of a vacuum cleaner having a hose including an operating handle connected to a suction nozzle, comprising: an electric control device for said motor mounted on said operating handle and being manually operable, electric conduits extending along said hose and being connected to said electric control device, a first coil connected to one of said conduits, said coil being arranged to surround the end of the hose which is connected to said vacuum cleaner, a second coil magnetically coupled to said first coil and connected to said electric control device, a tubular connecting part for said hose, a tubular flange on said vacuum cleaner for insertion of said connecting part, said first coil being arranged in said connecting part, and said second coil being arranged in said tubular flange.

4. A device as claimed in claim 3 wherein said connecting part is secured to the hose, a sleeve mounted on and surrounding said connecting part whereby said sleeve is rotatable relative to said connecting part.

5. A device as claimed in claim 4 wherein said sleeve is rotatably supported on said connecting part.

6. The device as claimed in claim 3 further comprising a dust container having an apertured cover and wherein the free end of said tubular flange is inserted in the aperture in the cover of said dust container, and said first and second coils being arranged in the space between the dust container and the opening for the hose connection to said vacuum cleaner.

* * * * *